Dec. 19, 1922.
H. H. SPARKS.
SIFTER.
FILED FEB. 5, 1921.
1,439,273
3 SHEETS-SHEET 1
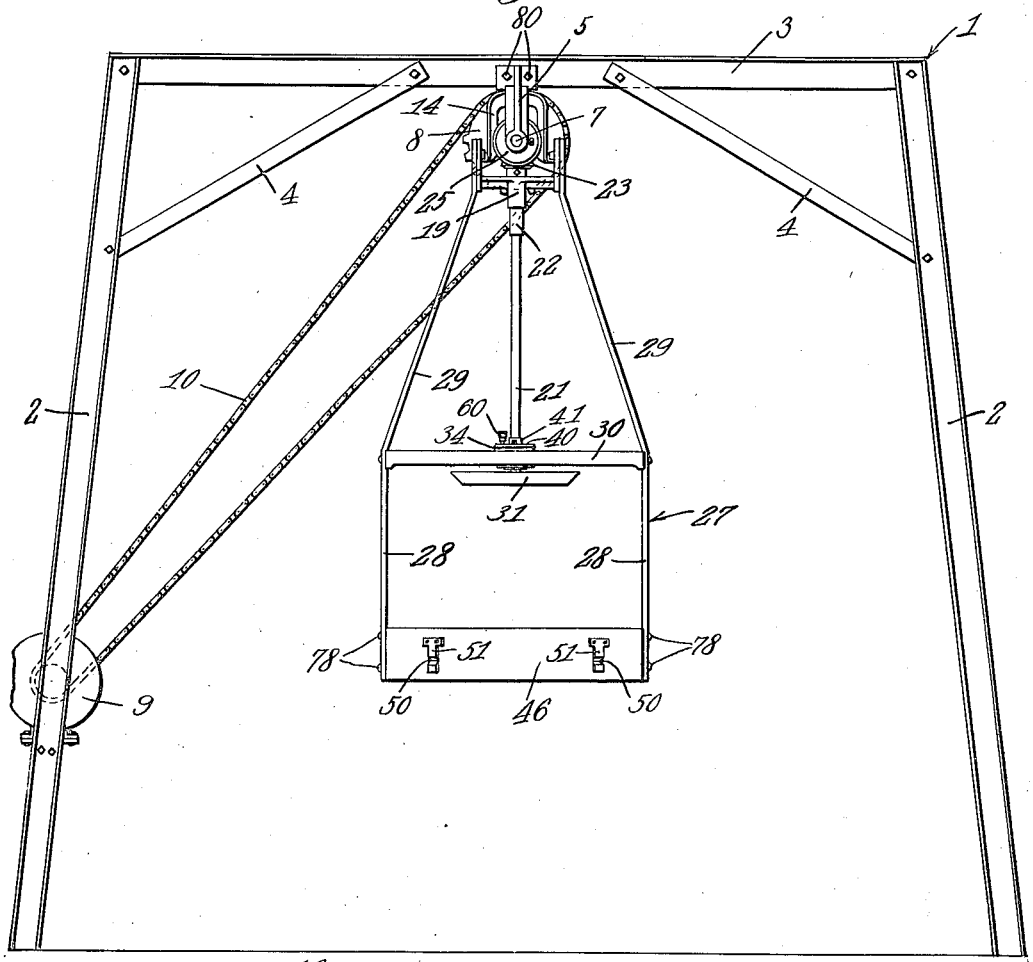
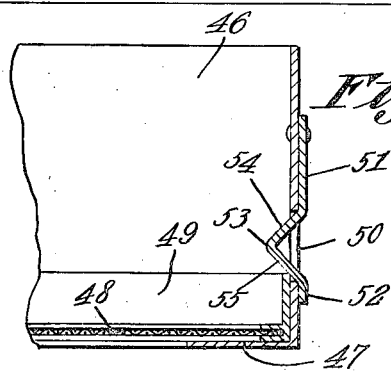
H. H. Sparks,
Inventor.

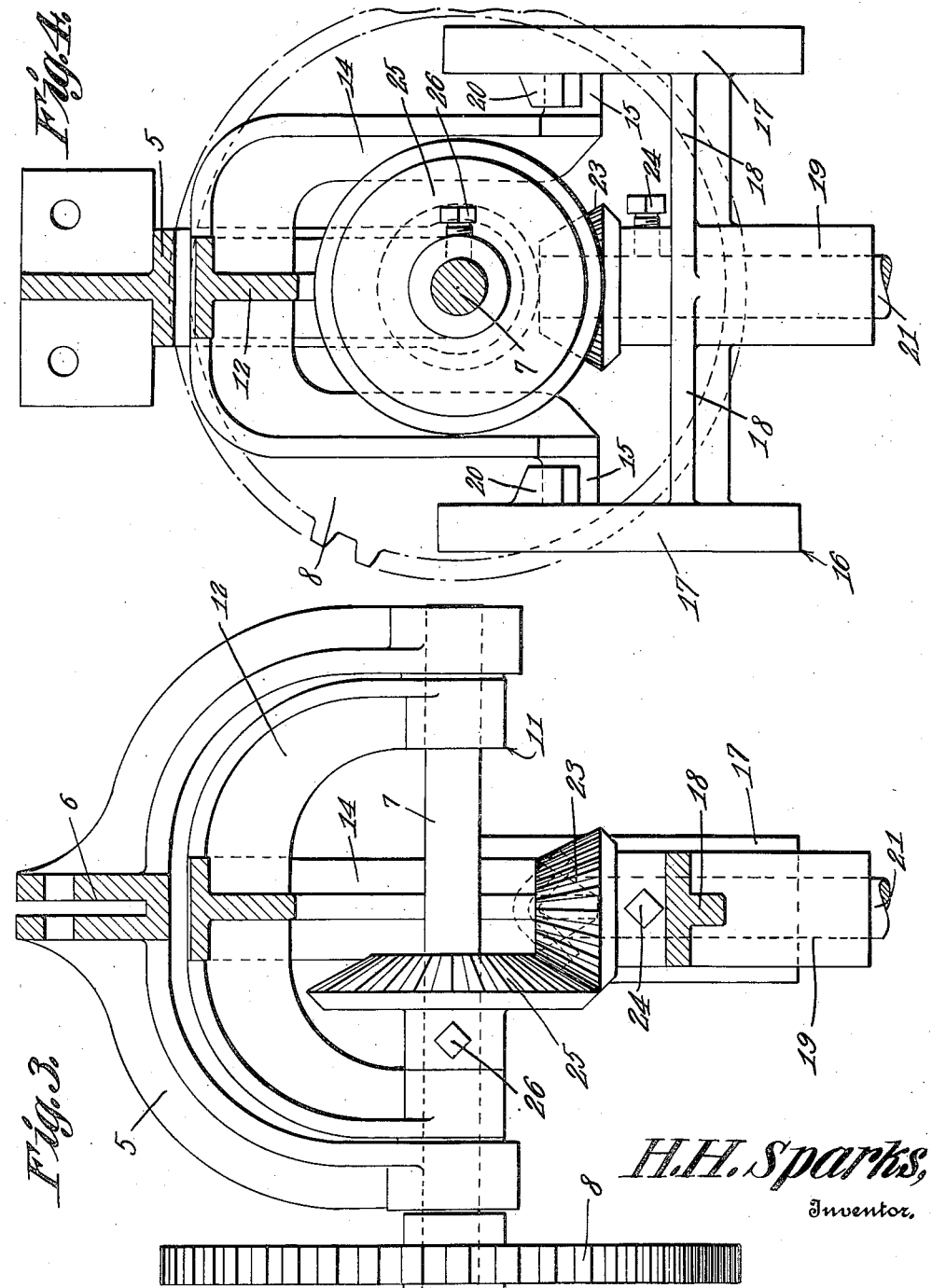

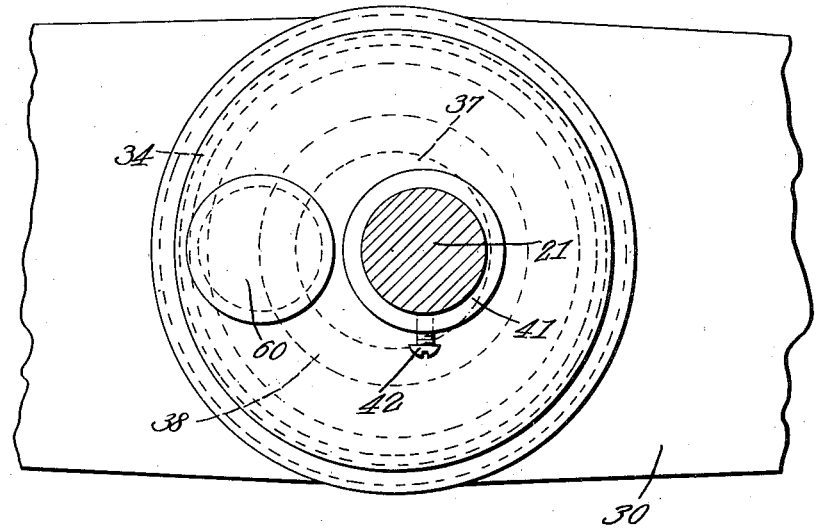
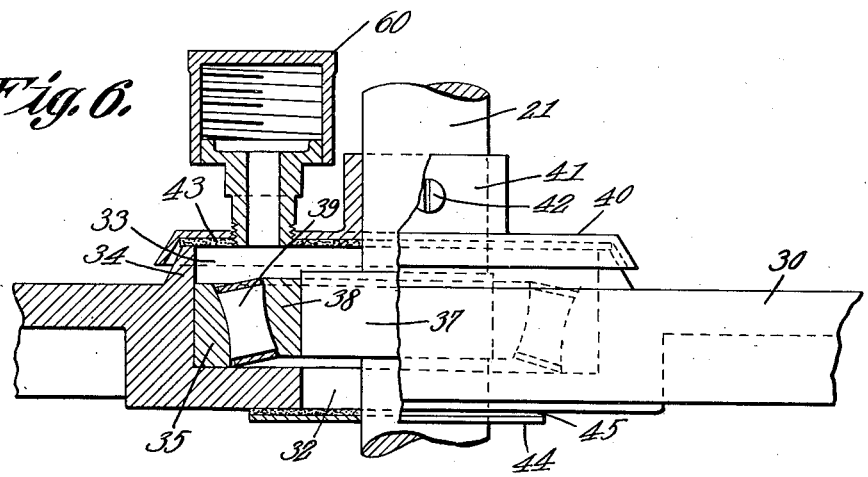
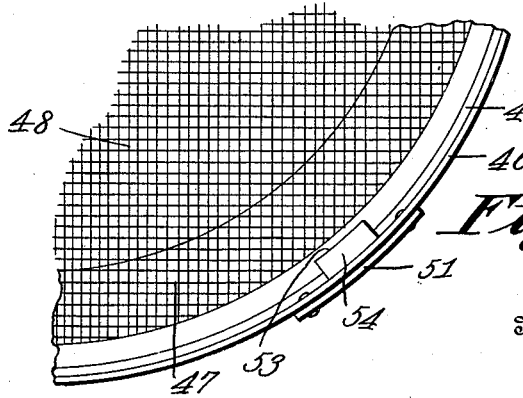

Patented Dec. 19, 1922.

1,439,273

UNITED STATES PATENT OFFICE.

HARRY H. SPARKS, OF KANSAS CITY, MISSOURI.

SIFTER.

Application filed February 5, 1921. Serial No. 442,778.

*To all whom it may concern:*

Be it known that I, HARRY H. SPARKS, a citizen of the United States, residing at Kansas City, in the county of Jackson and State of Missouri, have invented a new and useful Sifter, of which the following is a specification.

The device forming the subject matter of this invention is adapted to be employed for sifting or screening material of any sort, such as sand, for instance, and the invention aims to provide novel means for imparting a shaking movement to the screen. Another object of the invention is to provide novel means whereby the screen may be so supported that the necessary lateral movement may be imparted thereto.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings:—

Figure 1 shows in side elevation, a device constructed in accordance with the invention; Figure 2 is a sectional detail illustrating the means whereby the screen is secured in the screen holder; Figure 3 is a sectional detail illustrating a portion of the mechanism whereby the screen is suspended and whereby motion is transmitted to the screen; Figure 4 is a sectional detail wherein the mechanism disclosed in Figure 3 is shown at right angles to the disclosure in Figure 3; Figure 5 is a top plan showing a portion of the frame which carries the screen; Figure 6 is an elevation of the mechanism shown in Figure 5, parts appearing in section; Figure 7 is a fragmental top plan showing a portion of the screen and parts which carry the screen.

In carrying out the invention there is provided a support 1 which may be of inverted U-shape, as shown in Figure 1, the support comprising sides 2 and a top 3, the sides and the top being connected by braces 4. An arched bearing 5 is provided, the outline of the bearing appearing most clearly in Figure 3. The bearing 5 is supplied in its top with a slot 6, receiving the part 3 of the support 1, the bearing being secured to the element 3, as shown at 80. A shaft 7 is journaled for rotation in the bearing 5 and extends thereacross. A sprocket wheel 8 is secured to one end of the shaft 7. A prime mover 9 of any sort, such as an electrical motor or an internal combustion engine, is mounted on one of the sides 2 of the support 1, the prime mover 9 being connected operatively with the sprocket wheel 8 through the instrumentality of a drive chain 10, or in any other suitable way.

The device includes a hanger, denoted generally by the numeral 11. The hanger 11 embodies an inverted U-shaped member 12, disposed in a common plane with the bearing 5 and located within the bearing, the ends of the member 12 being mounted to rock on the shaft 7. The hanger 11 includes, further, a second U-shaped member 14, disposed transversely of the U-shaped member 12 and connected with the top portion of the member 12. The U-shaped member 14 is supplied at its lower ends with outstanding trunnions 15, shown best in Figure 4.

The numeral 16 marks a carrier, comprising side members 17 connected by a cross piece 18, the cross piece 18 carrying a tubular bearing 19. The side members 17 of the carrier have inwardly projecting seats 20, cooperating with the trunnions 15 to support the carrier for swinging movement.

A shaft 21 is journaled in the bearing 19, a weight 31 being secured to the lower end of the shaft. A universal joint 22, indicated conventionally in the drawings, is interposed in the shaft 21, the upper end of the shaft carrying a beveled pinion 23 which is secured to the shaft as shown at 24. The beveled pinion 23 meshes into a beveled pinion 25 secured at 26 to the shaft 7 and located within the U-shaped member 12.

The numeral 27 designates, generally, a depending frame, made up of side bars 28 having upwardly converging parts 29, the upper extremities of which are secured to the side members 17 of the carrier 16, the frame, thus, being mounted, through the instrumentality of the parts 20 and 15 to swing on the U-shaped member 14. The side bars 28 of the frame 27 are connected by a brace 30.

Detailed information concerning the brace 30 is available in Figure 6, the brace having a compartment 33, the lower portion of the brace having an opening 32 communicating with the compartment. The shaft 21 passes through the compartment 33 and through the opening 32. The opening 32 is enlarged with respect to the shaft 21, so that the frame 27, and particularly the brace 30 thereof, may have lateral movement with respect to the shaft 21—an observation which will be understood more clearly when the operation of the device is considered. The brace 30 has an upstanding rim 34, defining the upper end of the compartment 33. A race 35 is seated firmly and securely in the compartment 33. The shaft 21 carries an eccentric 37 located within the compartment 33, a race 38 being secured to the eccentric 37. A roller bearing or other anti-friction device, denoted by the numeral 39, is interposed between the races 35 and 38. The bearing 39 has not been described in detail, because it is an article of commerce, which may be bought in the open market. A cover 40 is disposed eccentrically with respect to the shaft 21 and is provided with an eccentric collar 41 receiving the shaft, the collar being secured to the shaft, as shown at 42. The cover 40 overhangs the periphery of the rim 34 on the member 30, as shown in Figure 6. A gasket 43 ordinarily is interposed between the cover 40 and the rim 34, the cover carrying an oil cup 60, whereby a lubricant may be introduced into the chamber or compartment 33. The shaft 21 carries a closure 44, controlling the opening 32, a gasket 45 being interposed between the closure and the lower surface of that portion of the member 30 wherein the compartment 33 is located.

The numeral 46 marks a cup-shaped holder having a bottom flange 47, the holder being located between the lower ends of the bars 28 of the frame 27 and being secured thereto as shown at 78, a carrier 49 fitting within the holder 46, and being supported on the bottom flange 47, as shown in Figure 2. The carrier 49 supports a screen 48 of any desired construction and mesh.

A means is provided for retaining the screen carrier 49 in the holder 46, and, with this end in view, openings 50 are fashioned in the side wall of the holder 46, latches 51, in the form of spring tongues (see Figure 2) being secured at their upper ends to the holder 46. The lower ends of the latches 51 rest against the outer surface of the holder 46, as shown at 52. Intermediate its ends, each latch 15 is bent to form an angular projection or elbow 53, extended into the opening 50. The elbow 53 embodies an upwardly inclined lower member 55, and a downwardly inclined upper member 54. When the carrier 49 is thrust downwardly into the holder 46, the carrier engages the member 54 and forces the latch 51 outwardly. Ultimately, the latch springs inwardly, the carrier 49 being held down by the part 55 of the latch.

In practical operation, motion is imparted to the chain 10 from the prime mover 9, the chain rotating the shaft 7 by way of the sprocket wheel 8. The shaft 21 is driven by way of the beveled pinions 25 and 23. The weight 31 maintains the shaft 21 vertical, or nearly so. When the shaft 21 is rotated, the eccentric 37 is rotated, and a glance at Figure 6, together with an inspection of Figure 1, will render it evident that the eccentric will impart a lateral reciprocatory movement to the frame 27 and to the screen 48, the screen exercising its obvious function.

Noting Figure 3, it will be clear that the hanger 11, including the members 12 and 14, may have a swinging movement on the shaft 7. Further, the frame 27 and the carrier 16 have a swinging movement on the member 14 of the hanger 11, at the points 15—20. The frame 27, therefore, is suspended for practically a universal movement, the frame and the screen 48 being permitted to travel in the path or orbit resulting from the movement of the eccentric 37. Although the frame 27 and the carrier 16 swing as one piece at the points 15—20, the driving connection between the beveled pinions 25 and 23 is not disturbed, interrupted or broken. The driving continuity between the beveled pinions 25 and 23 may be assured by exercising a little skill in the designing and making of the teeth in the pinions. As a matter of fact, however, there is very little relative movement between the pinions 23 and 25, due to the swinging of the frame 27, because, in the first place, the lateral throw of the frame 27, even at the extreme lower end thereof is not great, and is reduced, at a point adjacent to the upper end of the frame, practically to nothing.

Having thus described the invention, what is claimed is:—

1. In a device of the class described, a bearing; a shaft journaled in the bearing; a hanger mounted to swing on the shaft; a frame; means for mounting the frame for swinging movement on the hanger; a second shaft; a weight on the lower end of the second shaft; an eccentric on the second shaft; means for imparting movement from the eccentric to the frame; a driving connection between the shafts; and a screen mounted on the frame.

2. In a device of the class described, a bearing; a shaft journaled in the bearing; a hanger comprising a pair of U-shaped members disposed at right angles to each other and connected at their upper ends, one of said U-shaped members being mounted to swing on the shaft; a frame; means for mounting the frame for swinging movement on the other of said U-shaped members; a second shaft; a weight on the lower end of the second shaft; an eccentric on the second shaft; means for imparting swinging movement from the eccentric to the frame; a driving connection between the shafts; and a screen mounted on the frame.

3. In a device of the class described, a bearing; a first shaft journaled in the bearing; a hanger mounted to swing on the shaft; a carrier mounted to swing on the hanger; a frame secured to the carrier; a second shaft journaled in the carrier; a weight on the lower end of the second shaft; an eccentric on the second shaft; means for imparting movement from the eccentric to the frame; a driving connection between the shafts; and a screen mounted on the frame.

4. In a device of the class described, a support; a bearing on the upper portion of the support; a shaft journaled in the bearing; a prime mover on the side portion of the support; an operative connection between the prime mover and the shaft; a hanger mounted to swing on the shaft; a frame; means for mounting the frame for swinging movement on the hanger; a second shaft; a weight on the lower end of the second shaft; an eccentric on the second shaft; means for imparting movement from the eccentric to the frame; a driving connection between the shafts; and a screen mounted on the frame.

In testimony that I claim the foregoing as my own, I have hereto affixed my signature in the presence of two witnesses.

HARRY H. SPARKS.

Witnesses:
ALLEN H. DRAPER,
JNO. T. McRUER.